United States Patent Office 2,719,829
Patented Oct. 4, 1955

2,719,829

PREPARATION OF SILICA-ALUMINA CATALYSTS FROM FELDSPARS

Jacob Elston Ahlberg and Joseph W. Cox, Jr., Baltimore, Md., assignors to W. R. Grace & Co., New York, N. Y., a corporation of Connecticut No Drawing. Application July 10, 1951,
Serial No. 236,084

9 Claims. (Cl. 252—451)

This invention relates to catalysts for the conversion of petroleum hydrocarbons and more particularly to a novel silica alumina catalyst and a method of preparing it from feldspars.

During recent years catalysts have been used extensively in the treatment of petroleum oils for the conversion of those oils to products of different molecular structure. Typical operations in which the petroleum oils are passed in contact with catalysts, usually at conditions of elevated temperature, are the reforming of gasolines, the isomerization, polymerization and alkylation of hydrocarbons and the cracking of mineral oils to form products of a different molecular structure as well as a lower molecular weight and increased volatility.

Certain activated adsorptive clays have been used extensively as catalysts in the cracking of mineral oils to obtain higher yields of gasoline products of improved characteristics. More recently, synthetic silica-alumina catalysts, and particularly those prepared from sols and gels, have become of increasing importance because of their increased physical strength, hardness and resistance to attrition. The synthetic silica-alumina catalysts also result in the production of a gasoline of higher anti-knock quality and increased quantities of propylene, propane, butylene and butane which are of value in the manufacture of aviation base stocks and chemical products.

A conventional method of preparing synthetic silica alumina catalyst is to react sodium silicate with aluminum sulfate to form a hydrogel and then wash the hydrogel substantially free of soluble and zeolitically held salts. The washed gel is then dried and calcined to form an active catalyst.

Another method heretofore employed for preparing synthetic silica-alumina catalysts is to form a silica hydrosol, for example, by the neutralization of sodium silicate with a mineral acid, and impregnate the hydrosol with alumina trihydrate. A procedure of this nature is described in the patent of Gerald C. Connolly No. 2,474,888.

Another method heretofore employed for preparing synthetic silica-alumina catalysts is to form a silica hydrogel slurry by the reaction of sodium silicate with a mineral acid, impregnate the slurry with an aluminum salt followed by ammoniation after which soluble and zeolitically held salts are removed by washing.

In general, the processes heretofore available depend upon a source of pure alumina either in the form of an aluminum salt or of aluminum trihydrate. Both of these sources, particularly when in a substantially iron-free condition, are high priced and increase the cost of the catalyst materially.

It is an object of this invention to provide an improved dense silica-alumina catalyst of increased physical strength.

Another object of this invention is to provide an improved method of manufacturing silica-alumina catalysts.

A further object of this invention is the provision of a method of manufacturing silica-alumina catalysts from feldspars.

It is also an object of this invention to provide a method of manufacturing silica-alumina catalysts at a low cost in which the consumption of acid and ammonia are maintained at a minimum.

With these and other objects in view, as will become apparent in the following description, this invention resides in a process in which feldspars are roasted with caustic soda to form an acid reactible roast product which is neutralized with a mineral acid to form a silica-alumina gel suitable for treatment to form catalytic materials.

The feldspars providing the raw materials supplying alumina and silica are alumino-orthosilicates of sodium or potassium. They are widely available in a highly pure state, and may have an iron content ranging from a few hundredths of a percent up to a few tenths of a percent, the purity depending in part upon the manner of handling during the mining and grinding of the material. The most important commercially available feldspars are microcline, orthoclase, and albite, the first two of which are potassium or potassium sodium aluminum orthosilicates and the latter is substantially a sodium orthosilicate.

The commercially available feldspars in almost all instances consist of mixtures of "potash" feldspars and "soda" feldspars. In order to simplify the description of the reactions taking place in this invention, reference will be made to the feldspars as sodium salts. It will be appreciated throughout the description that "potash" feldspars are present to varying extents and will enter the same reactions described in connection with the "soda" feldspars. Similarly, the process will be described in connection with the treatment of feldspars with sodium hydroxide, since that material is cheaper and more readily available; however, the feldspars may be treated in a similar manner with potassium hydroxide.

Typical analyses of commercially available feldspars suitable for the preparation of catalysts according to this invention are as follows:

TABLE I

| Sample | A | B |
|---|---|---|
| T. V | 0.29 | 0.38 |
| $SiO_2$ | 70.74 | 67.12 |
| $Al_2O_3$ | 16.92 | 20.29 |
| $Fe_2O_3$ | 0.05 | 0.09 |
| $Na_2O$ | 3.98 | 4.69 |
| $K_2O$ | 7.73 | 6.69 |

A uniform mixture of caustic soda and feldspar is preferably obtained by mixing the finely ground feldspar with a 50% solution of sodium hydroxide and carefully heating the mixture to dryness. Excessive heating of the mixture during the drying should be avoided to prevent the formation of a hard, strongly adherent cake. If the sodium hydroxide is added in stoichiometric proportions, 0.30 pound of soda per pound of feldspar will be required for soda feldspar, and 0.29 pound of soda per pound feldspar for potash feldspar. The mixture is then roasted at a temperature of 500–800° F. for a period of one to three hours under which conditions the following reaction occurs:

$$NaAlSi_3O_8 + 2NaOH \longrightarrow NaAlSi_2O_6 + H_2O + Na_2SiO_3$$
(Leucite)

The reaction products as represented in the above equation are a sodium aluminum silicate, water and sodium metasilicate. One-third of the silica is separated from the aluminum silicate to react with the caustic soda, or an equivalent amount of caustic separated from the feldspar to form water-soluble sodium metasilicate. The remaining silica is combined with the aluminum and sodium as leucite, a water insoluble, acid reactible compound. Since sodium silicates having silica to soda ratios as high as 4 to 1 exist, ratios of caustic to feldspars of less than than the stoichiometric ratio for the above reaction may be employed with suitable control of the reaction conditions in the roasting operation. Generally, an excess of caustic will be employed to insure complete reaction of the feldspar. The excess caustic remains unreacted with the feldspar as a water soluble constituent of the roast.

In the preferred form of this invention, the product of the roasting operation is leached in water and filtered to separate the water insoluble leucite from the water soluble sodium metasilicate and any excess sodium hydroxide which may be present. Solution of the roast is facilitated by steaming or treatment with a small amount of hot water following the roasting. If separation of the sodium and potassium present in the solution from the leaching operation is desired, the solution may be partially evaporated to crystallize the sodium metasilicate, leaving the potassium salts in solution.

The water insoluble leucite is then mixed with an excess of a strong mineral acid such as sulphuric, hydrochloric or nitric to form an aluminum salt in a slurry of silica sol-gel. The absence of the sodium metasilicate separated in the earlier leaching step allows the acidification of the leucite at a higher pH than is possible if the entire product of the roasting operation is neutralized in a single operation. In addition, the elimination of the sodium metasilicate from the roast reduces the tendency to form an impervious coating of silica on unreacted leucite particles and thereby allows more complete neutralization.

The slurry of aluminum salt, preferably aluminum sulphate, and silica sol-gel, is reacted with an alkaline silica gel having a pH of about 10 to obtain a product having a pH in the neighborhood of 3. The alkaline silica gel may be prepared by the partial neutralization of the water soluble portion of the roast, or directly by neutralizing water glass. Control of the relative concentrations of silica and alumina in the final catalyst may be obtained by varying the amount and the silica to soda ratio of the alkaline gel. For example, the sodium metasilicate solution from the leaching of the roast may be mixed with a water glass of 3.25 to 1 silica to soda ratio, neutralized to a pH of about 10 to form an alkaline silica gel and then reacted with the aluminum salt impregnated silica gel when a catalyst having an alumina concentration of 13% is desired. The resultant gel, which preferably is in the form of a slurry, is ammoniated to a pH of 7 to precipitate the alumina.

After ammoniation, the resultant silica gel may be washed by the methods customarily employed by those skilled in the art, dried and calcined to form a catalyst. In a preferred procedure, the ammoniated gel is dewatered, washed with water, followed by a washing with 2% ammonium sulphate, again washed with water, and then dried and calcined.

*Example I*

A. T 200 mesh feldspar which analyzed 20.29% $Al_2O_3$, 67.12% $SiO_2$, 4.69% $Na_2O$, 6.69% $K_2O$, and 0.09% $Fe_2O_3$ was roasted for 3 hours at 700 F. with sodium hydroxide in a ratio of 1 pound feldspar to 0.70 pounds of sodium hydroxide to form a roast mixture A.

100 grams of the roasted feldspar alkali mixture A in finely powdered form were slurried with 200 cc. of water and heated to boiling with stirring for one hour. The solution of alkali silicate and sodium hydroxide after separation from the insoluble acid reactible leucite ($NaAlSi_2O_6$)—leached from the feldspar alkali roast was mixed with 103 grams 40° Baumé water glass (29% $SiO_2$, 9% $Na_2O$) and water, combined weight of which was 806 grams. 560 grams of a 10% sulfuric acid solution were added to the silicate solution with stirring resulting in the formation of a silica gel slurry of 9.9 pH. The insoluble leucite was added to a solution consisting of 25 cc. of 95% $H_2SO_4$ and 75 cc. of water, with violent agitation, forming the equivalent of a silica sol-gel slurry in an aluminum sulfate sulfuric acid solution which for convenience is referred to as the leucite slurry. The leucite slurry was diluted with water to 600 grams and added to the 9.9 pH silica gel slurry resulting in the formation of an aluminum sulfate impregnated silica gel slurry of 3.0 pH which was ammoniated with 40 cc. of ammonium hydroxide solution (28% $NH_3$) to 7 pH. The material was dewatered, dried, washed with water, with a 2% ammonium sulfate solution and again with water, again dried, after which it was sized to 30–100 mesh by grinding and agglomeration. The very small percentage of fines smaller than 200 mesh formed during the 3 hour activation in air at 1050° F. were discarded. The bulk density of the powder was 0.61 gram per cc.

*Example II*

B. T 200 mesh feldspar containing 21.34% $Al_2O_3$, 65.30% $SiO_2$, 5.76% $Na_2O$, 5.84% $K_2O$ and 0.032% $Fe_2O_3$ was roasted for 3 hours at 700° F. with sodium hydroxide in a ratio of 1 pound of feldspar to 0.35 pound of sodium hydroxide to form a roast B.

350 grams of roast B in finely powdered form were hydrated in 15 p. s. i. g. steam for one hour and further hydrated in 700 cc. water kept at 210° F. for one hour. The solution of alkali silicate and sodium hydroxide—after separation from the insoluble acid reactible leucite ($NaAlSi_2O_6$)— leached from the feldspar alkali roast was mixed with 748 grams 40° Baumé water glass (29% $SiO_2$, 9% $Na_2O$) and water, the combined weight of which was 4620 grams. 3.5 liters of a 4.7% sulfuric acid solution were added to the silicate solution with stirring resulting in the formation of a silica slurry of 9.75 pH. The wet insoluble leucite weighing 370.6 grams was suspended in 200 cc. water and added to a solution containing 69 cc. 95% sulfuric acid and 81 cc. water, while violently agitated, forming the equivalent of a silica sol-gel slurry in an aluminum sulfate solution of 0.75 pH which for convenience is referred to as the leucite slurry. The leucite slurry attained a temperature of 175° F. and was diluted to a volume of 2210 cc. after which it was added to the 9.75 pH silica gel slurry resulting in the formation of an aluminum sulfate impregnated silica gel slurry of 3.4 pH which was ammoniated with 100 cc. of ammonium hydroxide (28% $NH_3$) to 7.0 pH. The material was dewatered, dried, washed with water alone until the wash waters were sulfate free; again dried, after which it was sized to 310–100 mesh by grinding and agglomeration. They very small percentage of fines smaller than 200 mesh formed during the 3 hour activation in air at 1050° F. were discarded. After treatment in 60 p. s. i. g. steam at 1050° F. for 24 hours, the bulk density of the powder was 0.60 gram per cc.

Another method of preparing a silica-alumina catalyst via the sol or gel state is to treat the roast with an excess of acid to form a solution of an aluminum salt in a silica sol or gel. The acidified material is ammoniated to precipitate the aluminum salt as alumina, and washed, dried, and activated to form the catalyst. If desired, water glass or silica gel may be added to the roast to increase the silica content of the catalyst.

Catalysts of high alumina content may be prepared by base exchange of either the leached or unleached roast with stoichiometric quantities of acid, followed by washing, drying and activating. If the unleached roast is neutralized directly, the resultant catalyst has a silica to alumina molar ratio of 6 to 1 and an alumina concentration of 22%. If the roast is leached and the leucite neutralized, the molar $SiO_2$ to $Al_2O_3$ ratio will be 4 to 1, and the alumina concentration of the product will be about 30%.

Example III 100 grams of the roasted feldspar-alkali mixture A in finely powdered form were stirred and heated to boiling with about 100 cc. of water, after which the mixture was added to a sulfuric acid solution containing 100 cc. of water and 100 cc. of concentrated sulfuric acid. A thin slurry of 0.1 pH formed which gelled in about 4 hours. Ammonia was added until a pH of 7 was maintained while keeping the mixture near boiling for 0.5 hour. The material was dewatered, dried, washed until sulfate free after which it was dried, ground T 30 mesh and activated for 3 hours in air at 1050° F. The bulk density of the powder was 0.32 gram per cc.

Example IV 200 grams of A in finely powdered form were stirred and heated to boiling in a small volume of water after which the mixture was added to a sulfuric acid solution containing 300 cc. of water and 200 cc. of concentrated sulfuric acid. A thick slurry of 0.4 pH formed. Ammonia was added until a pH of 7 was maintained while keeping the mixture near boiling for about 0.5 hour. The material was dewatered, dried, washed until sulfate free after which it was again dried and ground T 30 mesh and activated for 3 hours in air at 1050° F. The bulk density of the powder was 0.22 grams per cc.

Example V 100 grams of the roasted feldspar alkali mixture A in finely powdered form were stirred and heated to boiling with 100 cc. water after which the mixture was added to solution containing 50 cc. water and 100 cc. of sulfuric acid. A slurry of 0.4 pH formed which gelled quickly. Ammonia was added until a pH of 7 was maintained while keeping the mixture near boiling for a half hour. The material was dewatered, dried, washed until sulfate free after which it was again dried, ground T 30 mesh and activated for 3 hours in air at 1050. The bulk density of the powder was 0.25 gram per cc.

Example VI 411.8 grams of the roasted feldspar alkali mixture A in finely powdered form were slurried with about 400 cc. water and heated to boiling after which it was added to 400 cc. of concentrated sulfuric acid containing 40 cc. water. 400 cc. of 40° Baumé water glass (29% $SiO_2$, 9% $Na_2O$) solution diluted with 800 cc. water was added to the mixture. A thin slurry of 0.3 pH was formed. Ammonia was added until a pH of 1.6 was established. Sediment was filtered off. After 48 hours the filtrate had not gelled. The filtrate was then re-acidified to 0.2 pH and allowed to stand over a weekend during which gelation occurred. The gel was slurried and ammoniated until a pH of 7 was maintained while heating for 2 hours. The material was dewatered, dried, washed until sulfate free after which it was sized to 30–100 mesh by grinding and agglomeration. Fines smaller than 200 mesh formed during the 3 hour activation in air at 1050° F. were discarded. The bulk density of the powder was 0.29 gram per cc.

Example VII 1915 grams of the roasted feldspar alkali mixture A in finely powdered form were slurried with 6575 cc. water and heated to boiling after which 2380 grams 40° Baumé water glass (29% $SiO_2$, 9% $Na_2O$) solution was added. The mixture after cooling to room temperature was added slowly, while agitating, to a solution containing 2910 cc. 95% $H_2SO_4$ and 6395 cc. water. The final temperature was 105–110° F. Gelation occurred during the mixing operations. The mixture was aged over night. Ammonium hydroxide was added until a pH of 7.4 was maintained while keeping the mixture at 120–140° F. The material was dewatered, dried, washed with water, with a 2% amonium sulfate solution and again with water until sulfate free; again dried, after which it was sized to 30–100 mesh by grinding and agglomerization. Fines smaller than 200 mesh formed during the 3 hour activation in air at 1050° F. were discarded. The bulk density of the powder was 0.31 gram per cc.

Samples of catalysts prepared according to the above examples were tested for oil cracking activity by passing 238 cc. of an East Texas gas oil over a fixed bed of 48 grams of the catalyst having particle sizes in the range of 30 to 100 mesh for 2 hours. The catalyst was supported in a vertical tube maintained at 850° F. by the surrounding furnace. Conversions of the oil into gasoline, gas, and coke, were determined by amounts of residual oil boiling above 400° F. that were recovered. The catalysts were tested after initial activation heating for 3 hours in air at 1050° F. and also after treating with steam at 60 lbs. per square inch gauge 124 hours at 1050° F. The activity is measured by the conversion into gasoline, gas, and coke. The results of the activity tests are illustrated in Table II in which sample A designates a silica-alumina catalyst containing about 13% alumina, commercially produced by conventional methods from aluminum sulfate and water glass and is illustrated for comparison.

TABLE II

| Sample | Activation | Bulk Density of Powder | Gasoline, Gas Plus Coke, percent | Carbon, percent |
|---|---|---|---|---|
| Commercial Catalyst | 3 hrs. air @ 1,050° F | 0.50 | 40.3, 39.8 | 1.9 |
| Do | 60 p. s. i. g. steam @ 1,050° F. for 24 hrs. | | 13.2 | 0.43 |
| 1 | 3 hrs. air @ 1,050° F | 0.61 | 34.9 | 0.10 |
| 2 | 60 p. s. i. g. steam @ 1,050° F. for 24 hrs. | 0.60 | | |
| 3 | 3 hrs. air @ 1,050° F | 0.32 | 35.4 | |
| 4 | do | 0.22 | 43.3 | |
| 5 | do | 0.25 | 33.4 | |
| 6 | do | 0.29 | 39.2 | 1.29 |
| 6 | 60 p. s. i. g. steam @ 1,050° F. for 24 hrs. | 0.35 | 15.7 | 1.14 |
| 7 | 3 hrs. air @ 1,050° F | 0.31 | 33.1 | 0.90 |

In addition to the important savings in acid and ammonia made possible by the separation and separate neutralization of the leucite and sodium silicate from the roast, a harder, more dense catalyst is also obtained. As illustrated in Table II, the formation of the silica gel separately from a dilute solution forms a gel having a bulk density two or more times as dense as the catalysts prepared by the neutralization of the entire roast.

We claim:

1. A process for the preparation of a silica-alumina gel comprising roasting feldspar with the hydroxide of an alkali metal at a temperature of about 500–800° F. to form a roast product, treating the roast product with sulfuric acid to form a dispersion of aluminum salt and a silica gel, and treating the acidified material with an alkaline reagent to precipitate alumina in the gel.

2. A process for the preparation of a silica-alumina gel comprising roasting feldspar with the hydroxide of an alkali metal at a temperature of about 500–800° F. to separate approximately one-third of the silica from chemical combination with the alumina in the feldspar, reacting the product of the roasting operation with a strong mineral acid to form a dispersion of aluminum salt in a silica gel, and treating the resulting material with ammonia to precipitate alumina in the gel.

3. A process for the preparation of a silica-alumina gel comprising roasting feldspar with a hydroxide of an alkali metal at a temperature of about 500–800° F. to separate approximately one-third of the silica on the feldspar from chemical combination with the alumina therein, leaching the product of the roasting operation with water, reacting the water insoluble portion of the leaching operation with a strong mineral acid to form a gelatinous silica having an aluminum salt distributed therethrough, and reacting the material with ammonia to precipitate the alumina therein.

4. A process for the preparation of a silica-alumina gel comprising roasting feldspar with caustic soda at a temperature of about 500–800° F. leaching the product of the roasting operation with water to separate the water soluble and water insoluble portions thereof, acidifying the water insoluble portion of the product of the roasting operation with an excess of a strong acid to form a solution of an aluminum salt in a gelatinous silica, reacting the acidified material with an alkaline silica gel, and ammoniating the reaction product to precipitate alumina in the silica gel.

5. A process for the preparation of a catalyst comprising roasting feldspar with the hydroxide of an alkali metal at a temperature of about 500–800° F. to form a roast product containing leucite, a silicate of the alkali metal and the excess hydroxide of the alkali metal, leaching the roast product with water to separate the leucite from the remainder of the products of the roasting operation, acidifying the leucite with a strong mineral acid to form an acid silica sol-gel impregnated with a salt of aluminum, reacting it with a silica gel having a pH of 10 to form a product having a pH of about 3, and ammoniating the thus formed product to precipitate alumina in the silica gel, and washing, drying and activating the silica-alumina gel to form a catalyst.

6. A process for the preparation of a silica-alumina catalyst comprising roasting feldspar with a hydroxide of an alkali metal at a temperature of about 500–800° F., acidifying the product of the roasting operation with an excess of acid to form a gelatinous silica having an aluminum salt therein, reacting the gelatinous material with an alkaline solution to precipitate alumina, and washing, drying, and activating the silica-alumina gel to produce a catalyst.

7. A process for the preparation of a silica-alumina catalyst comprising roasting feldspar with the hydroxide of an alkali metal at a temperature of about 500–800° F., separating the products of the roasting operation into water soluble and water insoluble components, acidifying the water insoluble components with an excess of acid, reacting the acidified material with an alkaline silica gel to form an acid silica gel having an aluminum salt suspended therein, ammoniating the aluminum salt-impregnated silica gel to precipitate alumina, and washing, drying, and activating the resultant silica-alumina gel to form a catalyst.

8. A process for the preparation of a silica-alumina catalyst comprising roasting feldspar with a compound selected from the group consisting of the oxides and hydroxides of sodium and potassium and mixtures thereof at a temperature of about 500–800° F. to separate about one-third of the silica from chemical combination with the alumina to form leucite and a silicate of an alkali metal, separating the leucite from the silicate of the alkali metal, adding an excess of acid to the leucite to form an acid aluminum salt-impregnated gelatinous silica, adding water glass and acid to the separated alkali metal silicate from the roasting operation to form an alkaline gelatinuous silica, reacting the alkaline gelatinous silica with the acid gelatinous silica to form a gelatinous silica product having a pH of about 3, ammoniating the product of the reaction of the two gelatinous silicas to precipitate the aluminum salts present therein, and washing, drying, and activating the ammoniated material to form a silica-alumina catalyst.

9. A process for the preparation of a silica-alumina catalyst comprising roasting feldspar with sodium hydroxide at a temperature of about 500–800° F. to form leucite and a silicate of sodium, separating the leucite and the silicate of sodium, acidifying the leucite with an excess of dilute sulfuric acid to form a slurry of a solution of an aluminum salt and a gelatinous silica, mixing the slurry with a silica gel having a pH of about 10 to form an aluminum sulfate impregnated silica gel having a pH of about 3, ammoniating the gel having a pH of 3 to precipitate alumina therein, and washing, drying, and activating the gel to form a catalyst.

References Cited in the file of this patent

UNITED STATES PATENTS

| | | |
|---|---|---|
| 2,203,850 | Tropsch | June 11, 1940 |
| 2,405,408 | Connolly | Aug. 6, 1946 |
| 2,408,207 | Garrison et al. | Sept. 24, 1946 |
| 2,442,884 | Webb et al. | June 8, 1948 |
| 2,548,860 | Bond | Apr. 17, 1951 |
| 2,565,886 | Ryland | Aug. 28, 1951 |